United States Patent [19]

Weiler

[11] 4,198,070
[45] Apr. 15, 1980

[54] STEP ASSEMBLY FOR AUTOMOTIVE STEP BUMPERS

[75] Inventor: Raywood C. Weiler, Fontana, Calif.

[73] Assignee: Blackstone Mfg. Co., Inc., Chicago, Ill.

[21] Appl. No.: 950,426

[22] Filed: Oct. 11, 1978

[51] Int. Cl.² .............................................. B60R 3/02
[52] U.S. Cl. ...................................... 280/166; 182/91
[58] Field of Search ..................... 280/166, 163, 169; 182/90, 91

[56] References Cited

U.S. PATENT DOCUMENTS

| | | | |
|---|---|---|---|
| 3,394,947 | 7/1968 | Strube, Sr. | 280/166 |
| 3,588,160 | 6/1971 | Reiner | 280/166 X |
| 3,627,350 | 12/1971 | Cross | 280/166 |
| 4,029,223 | 6/1977 | Adamski et al. | 280/166 X |
| 4,029,355 | 6/1977 | Wilhelmsen | 280/166 X |

Primary Examiner—John J. Love
Assistant Examiner—Michael Mar
Attorney, Agent, or Firm—Arnstein, Gluck, Weitzenfeld & Minow

[57] ABSTRACT

A step assembly for use on step bumpers of automotive vehicles includes a pair of mounting brackets adapted to be secured to a bumper, a lower step supported by said brackets and an upper step hingedly connected to and superposed on said bumper. Each of the brackets has a slot substantially in the form of an inverted J. The lower step has laterally extending pins which are received in the slots, thereby mounting the step for sliding and swinging movement between an operative position in which the tread of the lower step is disposed in close proximity to the bottom of the bumper, and an inoperative position in which the tread is disposed in overlying relation to the bumper. The lower step may be easily assembled with or removed from the brackets.

3 Claims, 5 Drawing Figures

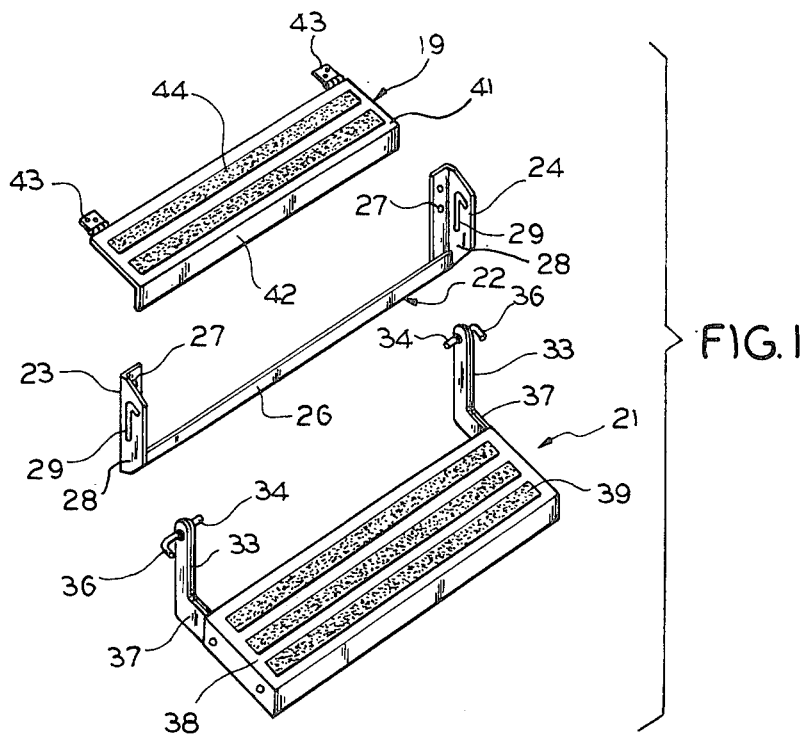
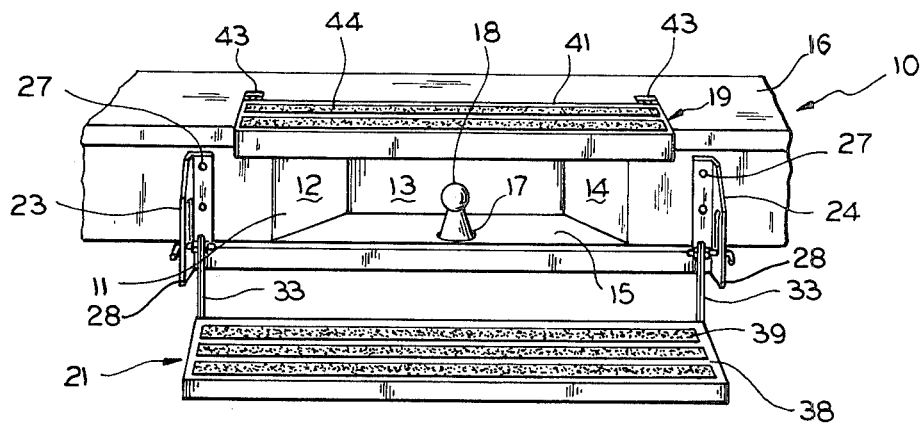
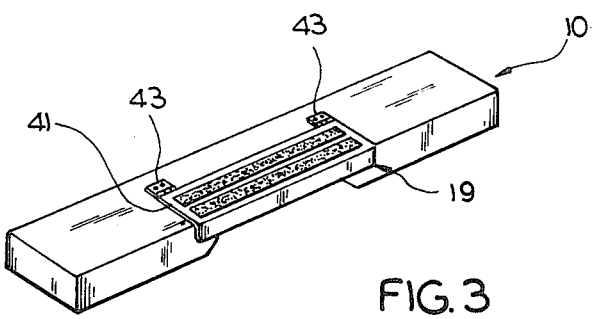

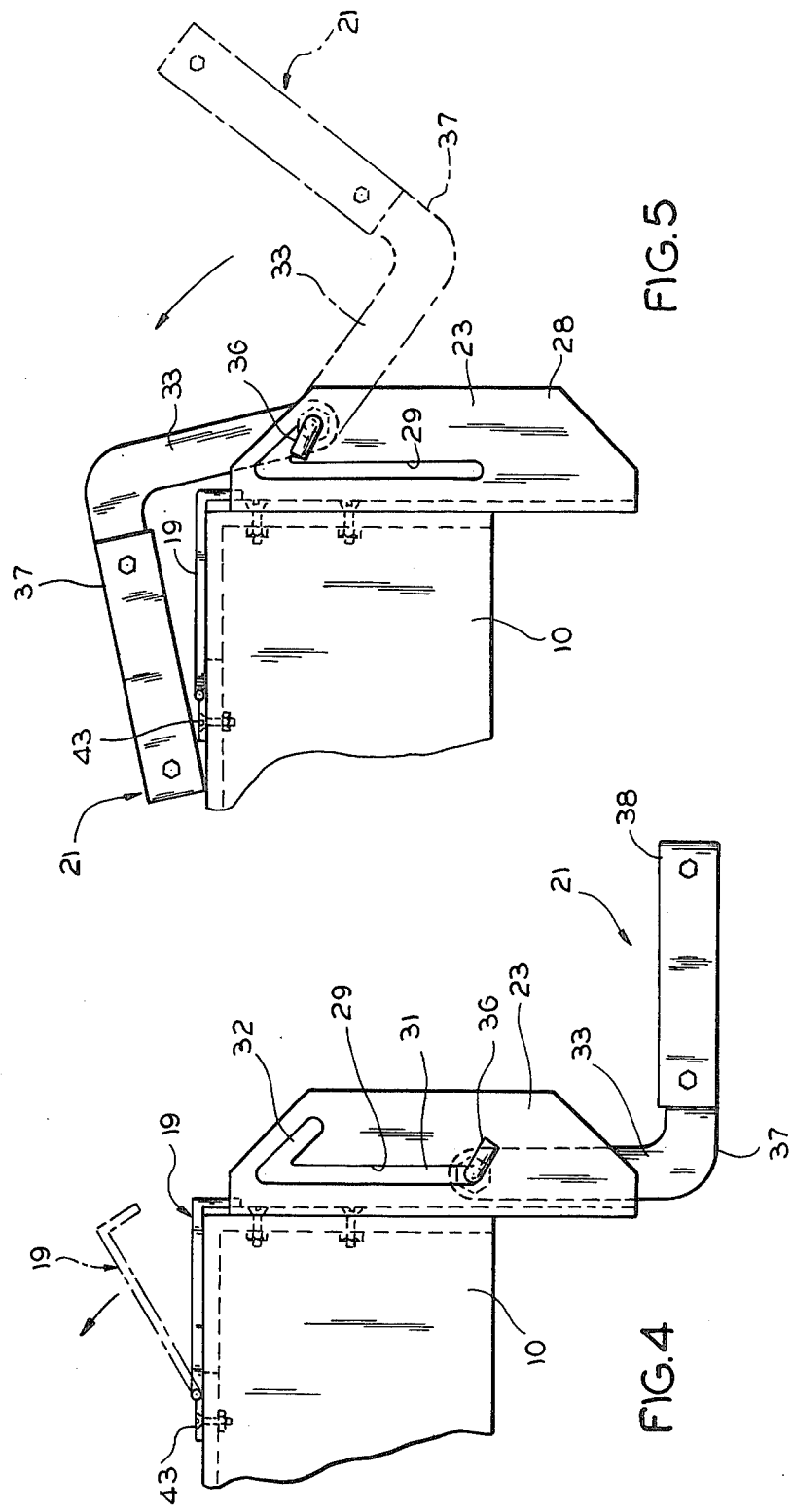

4,198,070

STEP ASSEMBLY FOR AUTOMOTIVE STEP BUMPERS

BACKGROUND OF THE INVENTION

This invention relates to a step assembly for use on step bumpers of automotive vehicles.

Certain types of recreational vehicles, such as campers, having rear door entrances are provided with rear bumpers which conventionally are formed with a central recess to provide a step for entrance and exit to and from the vehicle. Frequently, such steps are provided with an aperture to accommodate a coupler ball for a hitch, with the ball being located in the middle of the tread area and extending upwardly above the surface of the tread. In such case the ball is disposed in a rather awkward position as regards a user, requiring the user carefully to place his foot on either side of the ball in order to avoid injury to himself. It will be apparent that one unfamiliar with the step construction and under conditions of inadequate lighting could place his foot on the coupler ball and thereby lose his balance and fall, with possible injury to himself. Usually, the treads of such steps are disposed at arbitrary heights intermediate the street level and the floor level of the vehicle. In many cases the distance between the street level and tread, as well as the distance between the tread and the floor level, is substantially greater than the vertical distance between the treads of conventional stairs. Thus, a child or infirm person would experience difficulty in entering or exiting the vehicle.

SUMMARY OF THE INVENTION

In accordance with my invention, I provide a novel double step assembly to be mounted on a bumper step of a vehicle and providing two treads, one disposed below the bumper tread and the other above the bumper tread, so as to afford comfortable and easy ingress and egress into and out of the vehicle. Each step is foldable into and out of operative position.

BRIEF DESCRIPTION OF THE DRAWINGS

FIG. 1 is an exploded perspective view of the step assembly, in accordance with my invention.

FIG. 2 is a front perspective view showing the step assembly mounted on the step bumper of a vehicle.

FIG. 3 is a fragmentary perspective view of the top portion of the step bumper showing the upper tread of my step assembly attached thereto.

FIG. 4 is a fragmentary side elevation view, on an enlarged scale, showing the lower tread in operative position, and FIG. 5 is a similar view showing the upper tread in stored position.

BRIEF DESCRIPTION OF A PREFERRED EMBODIMENT

Referring now to the drawings and particularly to FIG. 2 thereof, the numeral 10 indicates a rear step bumper which is conventional equipment on certain types of vehicles having an access door in the rear of the vehicle. The step bumper 10 includes a central recessed portion 11 defined by vertical walls 12, 13 and 14 and a tread and a cover 16. The recessed portion 11 is open at the rear and at the top. The tread 15 may be provided with an aperture 17 through which projects a coupler ball 18. It will be understood that the ball 18 is suitably secured to the frame of the vehicle below the tread 15.

In most instances, the height of the tread 15 above ground level, as well as the distance between the tread and the floor level of the vehicle, is substantially greater than the vertical distance between adjacent or consecutive treads of conventional building steps. This increased height renders it difficult or inconvenient for a child or an infirm person to enter or exit the vehicle.

In accordance with my invention, I provide a step assembly which is adapted to be mounted on a step bumper and which provides tread surfaces which are easily and conveniently accessible for entering and exiting the vehicle.

Referring to FIG. 1, the step assembly comprises an upper step 19, a lower step 21 and a support means 22 for the lower step 21. The support means 22 comprises a pair of spaced angle mounting brackets 23 and 24 in allochiral relation and connected by a transverse member 26. Each bracket 23, 24 is provided with a plurality of holes 27 adapted to register with holes drilled in the bumper 10 to receive suitable fastening bolts. The brackets 23, 24 have rearwardly extending parallel portions 28, each being provided with a slot 29 substantially in the form of an inverted "J". Each slot 29 includes an elongated vertical leg 31 and a relatively shorter leg 32 in acute angular relationship with the vertical leg 31. It will be understood that the slots 29 are in transverse registration, with the bottom portions of the vertical legs 31 terminating substantially at the lower edge of the bumper 10. When mounted, the transverse bar 26 of the support means 22 is disposed immediately below the lower edge of the bumper 10.

The lower step 21 comprises a pair of spaced parallel "L" shaped bracket members 33 and fixed to the upper end of each bracket member 33 is a laterally extending pin 34, the outer end of which terminates in a laterally bent portion 36. Secured to the lateral arms 37 of the bracket members 33, as with rivets, is a tread member 38, the upper surface of which is preferably provided with skid-resistant strips 39. Referring to FIG. 2, it will be seen that the bracket members 33 are disposed between the mounting brackets 23, 24 with the pins 34 extending through respective slots 29. The laterally-bent portions 36 of the pins 34 are inclined downwardly in the direction of the tread 38. The step 21 is assembled with the mounting brackets 23, 24 by aligning the laterally-bent portions 36 of the pins 34 with the slots 31 and passing said portions through the slots 31. It will, of course, be understood that in order to effect such assembly it is necessary to tilt the lower step 21 about a transverse axis so as to obtain the necessary clearance for insertion of the laterally-bent portions 36 into the slots 31. The portions 36 of the pins 34 will pass through the slots 31 from the inside to the outside of the mounting brackets 23, 24 and, in assembled relation, the bracket members 33 supporting the tread are disposed adjacent to the inner sides of the respective mounting brackets 23, 24, with the bent portions 36 of the pins 34 being disposed adjacent the outer sides of the mounting brackets 23, 24, substantially as illustrated in FIG. 2.

The upper step 19 comprises a generally rectangular tread 41 having a depending longitudinal flange 42 and provided along its opposite longitudinal edge with a pair of spaced hinges 43 which are adapted to be bolted to the top 16 of the step bumper 10. Anti-skid strips 44 are secured to the surface of the tread 41. The upper step 19 is positioned so that it overlies and is in registration with the recess 11 and, when in the position illustrated in FIGS. 2 and 3, provides a surface on which a user may tread in entering or exiting the vehicle. The upper step may be easily tilted upwardly, as shown by the broken lines in FIG. 4, to afford access for attaching the socket of a hitch, not shown, to the ball coupler 18. After attachment has been completed, the upper step 19 is returned to its normal position, shown by the solid lines in FIG. 4.

In operative position, the lower step 21 assumes the position illustrated in FIGS. 2 and 4 with the pins 34 disposed at the bottoms of the slots 31. In such position, the tread 38 of the lower step 21 is disposed at a convenient elevation in relation to a street surface and, similarly, the tread 41 of the upper step 19 also is disposed at a convenient elevation in relation to the lower step 21 so that a user may enter or exit the vehicle comfortably and without effort.

In order to place the lower step 21 in inoperative position, the step is elevated and the pins 34 are slid into the bottoms of the angular slots 32. The step is rocked counterclockwise, as shown by the arrow in FIG. 5, to assume the position illustrated by the solid lines, in overlying relation to the upper step 19. It will be apparent that in such position, the lower step 21 does not interfere with the hitch or the trailer which is drawn in trail behind relation to the vehicle. It may be desirable under certain circumstances, to remove the lower step 21 from the mounting brackets 23, 24, and this may be readily done by positioning the step 21 so that the lateral portions 36 of the pins are aligned with the slots 29 and, then by tilting the lower step about its transverse axis sufficient clearance is obtained to pass the lateral portions 36 through the slots 29.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A step assembly for use on vehicles having a rear step bumper having a rear face and a top face and a median recess, said assembly comprising in combination,
   (a) a pair of angle mounting brackets adapted to be secured to the rear face of said bumper each outwardly of said recess,
   (b) each of said mounting brackets having a rearwardly extending portion having a slot substantially in the form of an inverted J with said slots being in transverse registration,
   (c) each of said slots having an elongated vertical leg and a shorter leg extending downwardly and outwardly from said bumper at an acute angle from the top of said vertical leg,
   (d) a lower step comprising a pair of substantially L-shaped bracket members supporting at their lower ends a transverse tread,
   (e) each of said bracket members carrying a transversely extending pin with said pins being in axial registration and with each pin extending through a respective slot,
   (f) each of the pins having a laterally bent terminal portion adjacent to the outer side of a mounting bracket, with said terminal portions being in transverse registration and inclined in the direction of the tread,
   (g) an upper step hingedly connected to the top face of said bumper and in operative position disposed in overlying relation to said recess,
   (h) said lower step being mounted for sliding and swinging movement between an operative position in which the pins are disposed at the bottoms of the vertical slots and the tread is disposed in close proximity to the bottom of the bumper, and an inoperative position in which the pins are disposed at the lower ends of the shorter slots and the tread is inverted in overlying relation to said upper step.

2. The invention as defined in claim 1 in which the lower step is assembled or disassembled in relation to the mounting brackets by tilting said lower step and aligning the pins with the slots so as to allow the pins to pass through said slots.

3. The invention as defined in claim 1 including a transverse bar rigidly connected to each of said mounting brackets.